Figure 1:
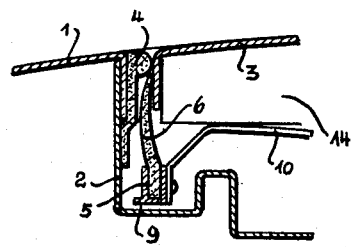

Nov. 10, 1964   J. WERNER   3,156,175
AIR DEFLECTOR FOR MOTOR VEHICLES
Filed July 13, 1961   2 Sheets-Sheet 1

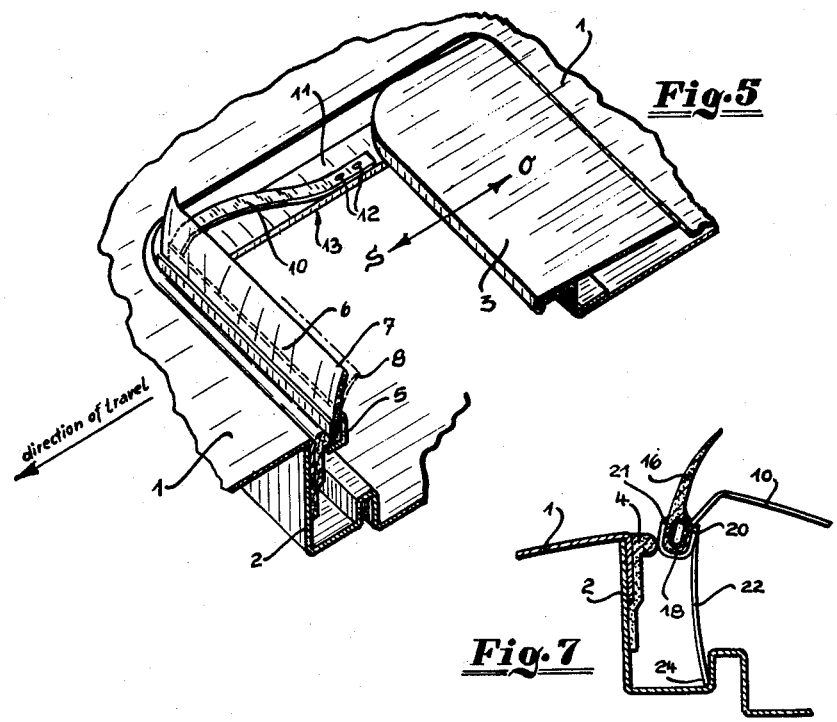
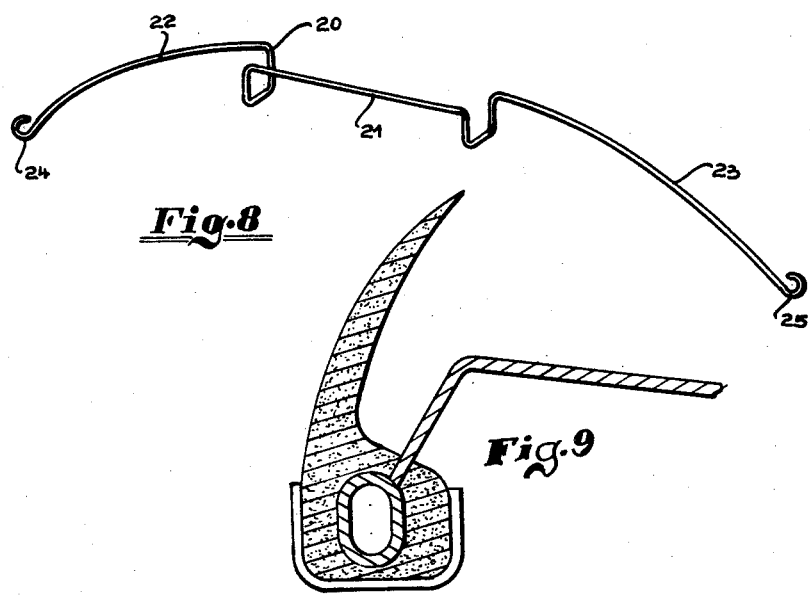

United States Patent Office 3,156,175
Patented Nov. 10, 1964

3,156,175
AIR DEFLECTOR FOR MOTOR VEHICLES
Johannes Werner, Offenbach (Main), Germany, assignor to H. T. Golde G.m.b.H. & Co. K.G., Frankfurt am Main, Germany
Filed July 13, 1961, Ser. No. 123,834
Claims priority, application Germany July 14, 1960
5 Claims. (Cl. 98—2)

This invention relates to an air deflector for motor vehicles with a slidable roof portion and has for an object to guide the air stream over the roof aperture when the slidable roof part is in its open position so as to avoid uncomfortable air disturbance within the vehicle for the occupants of the vehicle.

Various constructions of air deflectors are known with the deflector being either rigidly fixed to the vehicle and projecting permanently above the surface of the roof thereof or being mounted in a manner that they may be moved from an inoperative position below the surface of the roof when the movable roof part is shut to an operative position in which they are in transverse direction to the air slip stream. It is also known in connection with such movable air deflectors to mount them so that they automatically move into operative position under spring action when the slidable roof part is opened and are again pushed back into their inoperative position by said roof part when it is being shut.

The known air deflectors are constructed as practically rigid strips or plates of metal, hard plastic material or the like, which extend transversely across the vehicle substantially over the entire width of the roof aperture and in most cases are slightly inclined rearwardly and upwardly in order to obtain a good working effect. This is, however, only possible to a limited extent because the optimum angle of inclination is dependent upon the speed of the air stream, that is upon the speed of travel. However, adjustment to suit the actual speed is practically impossible when the vehicle is running.

This objection to the known deflectors is overcome according to the invention by an air deflector which automatically adjusts its angle of inclination to the speed of the slip stream. For this purpose the deflector according to the invention is made from a strip of soft elastic material the lower edge of which is stiffened or reinforced by a bar of rigid material which is provided in its longitudinal direction with a curvature which corresponds to the curvature of the roof in transverse direction of the vehicle and provided at its ends with known means for mounting the deflector on the vehicle.

The soft elastic strip is preferably of a shape tapering from bottom to top and its inclination and degree of stiffness are so chosen that the profile scarcely changes in the case of low speeds of travel and air flow. However, as soon as the air pressure on the elastic strip increases, the profile yields towards the rear and automatically assumes the most favourable inclination. It has been found, for example that in the case of some vehicles when running at a high speed the portion of the air deflector in the middle of the roof is bent far back towards the rear while the ends are scarcely bent back at all, which tends to indicate that the air flow conditions are not uniform over the width of the roof. As above stated, the chief advantage of the air deflector according to the invention consists in the automatic adjustment to the theoretically most favourable position and consequently the avoidance disturbing eddy current formations, which in turn has the advantageous effect that even when running at high speed a wide opening of the sliding roof may be used without disturbance. Furthermore, the flexible construction of the air deflector enables it to be accommodated in a small space when not in use and without cutting off a portion of the effective area of the roof aperture for the purpose.

The rigid bar for reinforcing the elastic strip can be firmly connected to the strip, for example by riveting, cementing, clamping or other suitable means. In the preferred form of construction the bar is completely embedded in the strip and is preferably of hollow cross section. Furthermore, the bar can be provided with any suitable profile and be made from any practically rigid material.

For mounting the air deflector on the vehicle the rigid bar may be provided at both ends with arms extending towards the rear which are pivotally mounted on the vehicle laterally of the roof aperture and can swing under spring action from the inoperative position into the operative position in which the air deflector is raised above the upper surface of the roof.

According to a further embodiment of the invention, a resilient support may be provided in addition to the rigid bar, said resilient support engaging the lower edge of the air deflector between the two ends thereof, pressing it against the front edge of the roof aperture whereby vibrations of the air deflector are positively avoided. Such a support preferably consists of an arched bow of spring steel which has at the top a holder for the lower edge of the air deflector, for example in the form of a clamping device, while the resilient arms of the support bear on and slide along the front transverse portion of the slidable roof panel frame.

Figure 2:
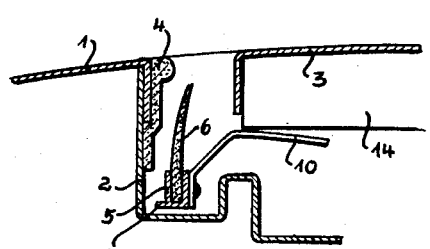
Figure 3:
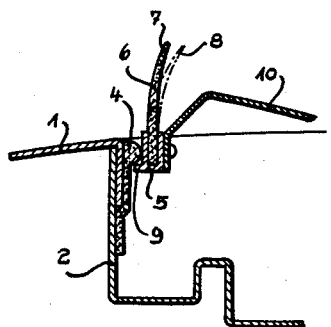
Figure 6:
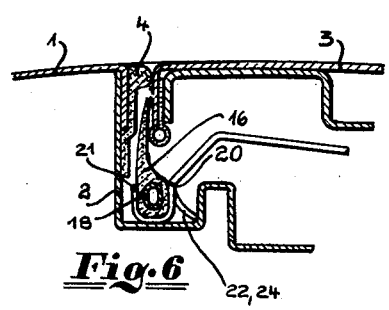
Figure 4:
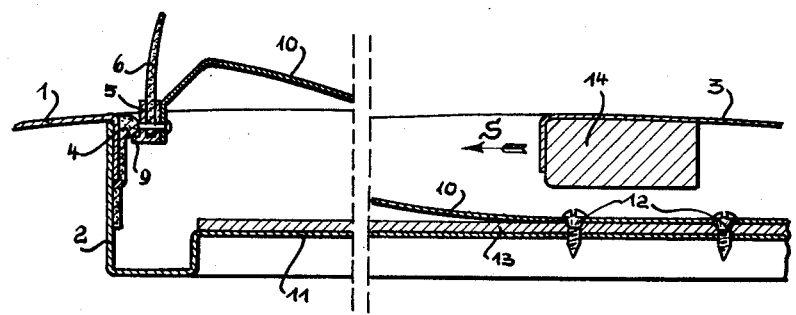

In order that the invention may be clearly understood and readily carried into effect, reference will now be made, by way of example, to the accompanying drawing, wherein:

FIG. 1 is a central vertical longitudinal section through a vehicle roof taken in the region of the front transverse part of the sliding roof frame, showing an air deflector according to the invention in its inoperative position with a roof panel shut;

FIG. 2 a similar view to FIG. 1, with the slidable roof panel pushed back only slightly;

FIG. 3 a similar view to FIGS. 1 and 2 with the slidable roof panel further open, whereby the air deflector assumes its operative position;

FIG. 4 a vertical longitudinal section at the right-hand side part through the slidable roof panel as well as through the air deflector and its mounting means;

FIG. 5 a perspective top plan view of the right-hand half of the vehicle roof with partly open slidable panel;

FIG. 6 a sectional view similar to FIG. 1 for an air deflector according to another embodiment of the invention;

FIG. 7 a similar sectional view to FIG. 6 with the air deflector in its operative position;

FIG. 8 a perspective view of a detail of the embodiment according to FIGS. 6 and 7, and FIG. 9 is a detail view of the strip and support therefor similar to that shown in FIG. 4 but for the embodiment of the deflector shown in FIG. 6.

According to FIGS. 1–5 of the drawings the top plate 1 of the vehicle roof has a downwardly bent edge flange which is rigidly connected to a frame 2 reinforcing the roof opening and guiding the slidable roof part. The frame has a fixed packing strip 4 attached thereto which has at the upper edge of its cross section a head projecting into the edge gap and against which the front edge of the rigid slidable panel 3 which is also bent down at an angle of about 90°, bears when the panel is in closed or shut position.

The air deflector is composed mainly of a soft elastic strip 6, for example of soft rubber or fabric coated with polyvinyl chloride, which is reinforced or stiffened at its lower edge by a practically rigid bar 5 which, in the embodiment according to FIGS. 1–5 consists of a substantially U-shaped metal section which firmly engages the elastic strip on both sides thereof. As can be seen from the drawings, the bar 5 conforms to the curvature of the vehicle roof in the transverse direction and is accommodated in a channel profile of the front transverse part 2 of the roof frame, said channel forming a gutter for draining off water. The upper portion of the elastic strip extends into the gap between the rigid rod part 1 or the packing strip 4 respectively and the front edge of the slidable panel 3.

FIG. 2 shows the same parts as FIG. 1 when the slidable panel 3 is pushed back only slightly, the air deflector then being still in its lowermost position before it swings upwardly into its operative position. Here the normal profile of the elastic strip 6 is shown to be bent slightly back according to the desired operative position. Therefore in the closed roof position known deflectors as made from practically rigid material cannot extend into the gap since otherwise the roof opening could not be shut. Therefore to accommodate a known rigid air deflector in the front transverse part of the roof frame, the draining gutter and consequently the roof frame must be of greater depth which is extremely unfavorable in modern low-built vehicles, since the headroom for the occupants of the vehicle is reduced thereby. Due to the air deflector 6 according to the invention which is made from elastic material, it adapts itself to the narrow gap between the rigid vehicle roof 1 and the slidable panel as shown in FIG. 1 and thus enables a deflector 6 of sufficient width to be accommodated so that it is concealed from above, without it being necessary to make the frame profile 2 deeper.

FIG. 3 shows the same parts as FIGS. 1 and 2, but with the slidable panel 3 pushed further back, when the air deflector is in operative position with its effective part above the top surface of the roof. Here a forwardly projecting flange 9 of the rigid U-section 5 engages the head of the packing strip 4, thereby forming a perfectly tight seal of the air deflector in downward direction and at the same time limiting the swinging movement in an upward direction. The tight seal is under spring action, as will be hereinafter described with reference to FIG. 4.

FIG. 4 is a longitudinal section through the vehicle roof taken near the right hand end of the air deflector. The air deflector comprising the elastic strip 6 and metal section 5 is mounted on both side parts 11 at the right and left of the slidable roof panel frame by means of two metal springs 10, though only the right hand parts will be described herein. The tension of the spring 10 is chosen to press the air deflector upwards into its operative position, the spring being, according to FIG. 4, riveted at its free end to the section 5 of the air deflector and fixed at its rear end to the frame 11 by means of screws 12. These screws 12 serve at the same time for securing on both sides guide rails 13 which cooperate with guide shoes (not shown) on the slidable panel 3 to enable the panel to be shifted into its open and shut positions (arrow OS). The pre-tension of the spring 10 is such that the forwardly projecting nose 9 on the profile of the air deflector bears resiliently against the head on the profile of the packing strip 4, with the result that the air deflector is prevented from vibrating when the vehicle is travelling. It is evident that the abutment between the lower edge of the air deflector and the front boundary of the roof aperture can also be made in any suitable manner so that the upward movement of the air deflector is limited and at the same time air is prevented from flowing under or around the lower edge of the air deflector.

When moving the panel 3 towards its shut position (arrow S) the spring 10 is pressed downwardly by a slide 14 which is fixed to the slidable panel. The slide 14 runs on the upper surface of the spring 10 ascending at an incline and thereby gradually swings the air deflector downwards into its inoperative position in the front portion of the roof aperture as the shutting movement progresses.

In addition to the small space required, as shown in FIG. 1 by an air deflector according to the invention the upper portion of which is made of elastic material, this deflector presents the particular technical advantage of adjusting itself with regard to its angle of inclination in relation to the speed of the slip stream air current, as indicated in chain dotted lines FIGS. 3 and 5. The adjustment of the elastic strip in normal position when travelling at a slow speed is indicated by 7 in full lines. It corresponds to the normal shape of the deflector, whereas as the speed increases, the elastic strip yields and thus automatically adjusts itself to an inclination favorable from an aerodynamic point of view to prevent eddies from entering the passenger compartment thereby assuming, for example, the position shown in chain dotted lines in FIGS. 3 and 5 and designated by numeral 8. A particular advantage is that the adjustment is not only automatic but takes place continually, being governed by the actual speed of the slip stream.

In the embodiment illustrated in FIGS. 6 to 9, the parts corresponding to those of the first embodiment are provided with similar reference numerals. In this embodiment, however, the elastic strip 16 is reinforced by a hollow bar 18 which is embedded completely in the strip 16. It is evident that a reinforcement which is different from that of a hollow bar can be employed however the latter represents the preferred form of construction. Some other hard material, for example, plastic, can also be used instead of metal for reinforcing or stiffening the strip 16.

The reinforcement bar 18 can be directly embedded in the strip when the elastic strip 16 is being formed or it can be introduced subsequently into a bore provided for it in the lower thickened part of the elastic strip. Such bore may also be provided with a radial slot for accommodating the reinforcement bar 18.

Since the air deflector, in its inoperative position shown in FIGS. 1 and 6 is to be accommodated in the U-shaped part of the frame 2 constituting a water gutter, with its upper edge between the rigid roof 1 and the slidable panel 3, it is important to limit the dimensions of the deflector to a minimum. In order to avoid in a reliable manner any vibrations of the deflector while the same is in its operative position, a resilient support may be provided in addition to the reinforcing bar 5 (FIG. 1) or 18 (FIG. 6) which support presses the middle portion of the air deflector firmly against the front edge of the rigid roof 1 or the packing strip 4 fitted thereon respectively. A preferred embodiment is illustrated in FIGS. 6 to 8. An upwardly arched bow 20 formed of spring steel has intermediate its ends an offset portion 21 by means of which the bow is firmly clamped to the bottom part of the air deflector. The ends 24 and 25 of the resilient arms 22 and 23 of the bow slidably bear against the bottom of the water gutter in the transverse part 2 of the roof frame. As these ends 24 and 25 are slightly bent rearwards (opposite to the direction of travel) the air deflector in the operative position shown in FIG. 7 is pressed upwards and forwards by the supporting bow 20 so that it bears firmly against the rigid roof part 1 and is secured against possible vibration especially at high velocities of the vehicle. When shifting the air deflector 16 into its inoperative position shown in FIG. 6, the ends 24, 25 of the supporting bow 20 slide lengthwise of the cross frame part 2, and as the curvature of the supporting bow decreases the pressure of the arms 22, 23 in forward direction also decreases considerably, so that the movement of the air deflector is insignificantly impeded by any pressure of the bow 20 in forward direction.

I claim:

1. In a motor vehicle having a curved roof, and an opening in said roof defining lateral longitudinally extending edges and front and rear transverse edges, the vehicle further having a slidable roof portion movable between retracted and extended positions for respectively opening and closing said opening: an air deflector for diverting the air stream from said opening with the roof portion retracted, said air deflector comprising: a thin strip of elastic material supported adjacent the front edge of the roof opening and extending substantially over the entire width of the opening, said strip having upper and lower ends, a rigid bar supporting the strip only at the lower end thereof while leaving the remainder of the strip free for deflection, said bar having opposite ends and a longitudinal curvature corresponding to the transverse curvature of the vehicle roof, rearwardly extending resilient arms connected to the ends of the rigid bar to support the same and means mounting said arms on the vehicle laterally of the roof opening at a location in the path of the slidable roof portion, said arms being mounted on the vehicle remote from the bar such that the resilient arms cause the bar and the strip therewith to be urged upwardly to a position whereat the strip projects above the opening in the roof with the slidable roof portion in the retracted position thereof, said resilient arms being mounted by the last said means with at least a portion of the arms in the path of movement of the movable roof portion for being contacted and resiliently deformed by the slidable roof portion as the latter is moved to the extended position thereof to displace the bar and the strip to a withdrawn position beneath the roof opening.

2. The air deflector according to claim 1, further comprising a forwardly projecting flange in the region of the lower edge of the strip, and a packing strip mounted on said front transverse edge of the roof and including a rearwardly directed head for engaging the forwardly directed flange to limit upward movement of the bar and strip supported therein.

3. The air deflector according to claim 1, wherein said rigid bar has a U-shaped profile in which said lower edge of said strip is accommodated, said bar having a height which is considerably less than the height of the strip as measured between the upper and lower end thereof.

4. The air deflector according to claim 1, wherein said rigid bar is embedded in the lower end of said strip.

5. The air deflector according to claim 4, comprising means defining an arched bow including a middle portion engaging the lower end of said strip, and end portions slightly curved in a rearward direction and slidably supported with respect to said roof in a direction parallel to the transverse edges of the opening.

References Cited in the file of this patent

UNITED STATES PATENTS

| 2,156,615 | Bishop | May 21, 1939 |
| 2,582,914 | Reed | Jan. 15, 1952 |

FOREIGN PATENTS

| 769,398 | Great Britain | Mar. 6, 1957 |